(12) United States Patent
Takizawa (10) Patent No.: US 6,202,508 B1
(45) Date of Patent: Mar. 20, 2001

(54) SILK HAT FLEXIBLE ENGAGEMENT GEAR DEVICE

(75) Inventor: Noboru Takizawa, Nagano-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 09/319,076

(22) PCT Filed: Oct. 2, 1997

(86) PCT No.: PCT/JP97/03572

§ 371 Date: Jul. 30, 1999

§ 102(e) Date: Jul. 30, 1999

(87) PCT Pub. No.: WO99/18364

PCT Pub. Date: Apr. 15, 1999

(51) Int. Cl.⁷ .................................................. F16H 1/32
(52) U.S. Cl. ................................................ 74/640; 74/411
(58) Field of Search ........................ 74/411, 640; 475/80

(56) References Cited

U.S. PATENT DOCUMENTS

| | | | |
|---|---|---|---|
| 5,269,202 | * 12/1993 | Kiyosawa et al. | 74/640 |
| 5,282,398 | * 2/1994 | Ishikawa | 74/640 |
| 5,429,556 | * 7/1995 | Ishida et al. | 475/80 X |
| 5,485,766 | * 1/1996 | Ishikawa | 74/640 |
| 5,715,732 | * 2/1998 | Takizawa et al. | 74/640 |
| 5,850,765 | * 12/1998 | Shirasawa | 74/640 |

FOREIGN PATENT DOCUMENTS

| | | |
|---|---|---|
| 60-95235 | 5/1985 | (JP) . |
| 3-118346 | 12/1991 | (JP) . |
| 8-166052 | 6/1996 | (JP) . |

* cited by examiner

*Primary Examiner*—David A. Bucci
*Assistant Examiner*—Colby Hansen
(74) *Attorney, Agent, or Firm*—Burns, Doane, Swecker & Mathis, L.L.P.

(57) ABSTRACT

A flexible engagement gear device (11) has a silk-hat shaped flexible external gear (13) which has a body part (22), a diaphragm (23) and a boss (25). The diaphragm (23) has a plate-shaped part (28), a sectional shape of which, when cut along a plane including a device axial line (11a), is defined at one side by a straight line (232) extending in a radial direction, and at the other side by a first convex circular arc (240), a concave circular arc (250) and a second convex circular arc (260) in this order from the side of the boss. Among these arcs, the first convex arc (24) has the largest curvature, while the concave circular arc (25) has the smallest curvature. The concave circular arc (250) is positioned at the middle of the plate-shaped part (28), the thickness of which is the smallest in the plates-shaped part (28). If the flexible external gear having this cross section is used, when the axial length is reduced, the stress concentration can be relieved without increasing the outer diameter.

11 Claims, 7 Drawing Sheets

SILK HAT FLEXIBLE ENGAGEMENT GEAR DEVICE

TECHNICAL FIELD

This invention relates to a silk-hat type flexible engagement gear device having a silk-hat shaped flexible external gear. More specifically, this invention relates to a silk-hat type flexible engagement gear device which is capable of relieving stress concentration occurred respective portions of a silk-hat shaped external gear to thereby reduce the outer diameter thereof.

BACKGROUND ART

As the flexible engagement gear device, there has been known one that has a flexible external gear of a silk hat shape. In this specification, this type of device is referred to as a silk-hat type flexible engagement gear device.

Figure 8:
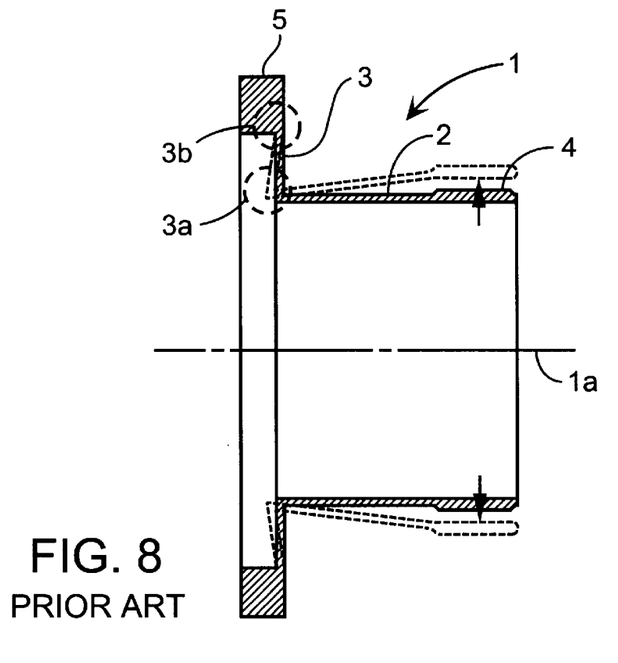
FIG. 8 is a schematic sectional view of a flexible external gear of a conventional silk-hat type flexible engagement gear device.

FIG. 8 is a longitudinal sectional view of a flexible external gear of a silk-hat type flexible engagement gear device, cutting along a plane including its device axial line. As shown in this FIGURE, the flexible external gear 1 has a annular body part 2, a circular diaphragm 3 having an inner decumferential end connected to a proximal-side opening end, and a circular thick boss 5 connected to an outer circumferential end of the diaphragm 3. External teeth 4 are formed integrally on an outer circumferential portion of a distal-side opening end of the body part 2 in a circumferential direction.

The device of this type has an advantage in that a rotational member, various wires and the like can be arranged passing through the device. Namely, since the flexible external gear has the diaphragm 3 extending radially and outwardly from the end of the body part 2, an inner space of the body part 2 can be utilized effectively.

Recently, robots and other machinery have been required to construct compact in size, and therefore miniaturization of reduction device and other mechanisms assembled in robots et al. has also been strongly demanded more than ever. In order to meet this demand, the silk-hat type flexible engagement gear device may be reduced in axial length. For this end, the silk-hat shaped flexible external gear must be reduced in axial length. The conventionally used external gear has a ratio of about 1:1 between the axial length thereof and the pitch circular diameter of the external teeth thereof. If the axial length is made shorter, the coning angle of the external gear is also increased according to the shortening of the axial length.

Figure 9:
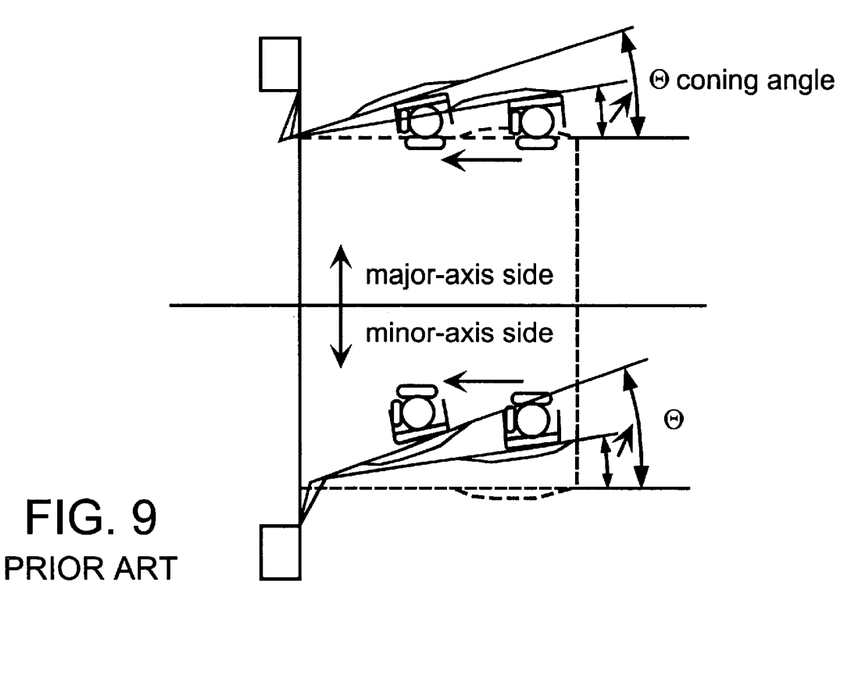
FIG. 9 is an explanatory view showing increase of coning angle by reducing the axial length of the flexible external gear.

FIG. 9 illustrates the increase of the coning angle Θ of the flexible external gear 1 according to the axial length thereof. As shown in this FIGURE, the increase of the coning angle causes to increase an amount of deformation occurred on portions of the diaphragm 3. As a result, there is a high possibility that an excess stress concentration occurs on the respective portions of the diaphragm 3, especially on the inner end portion 3a and the outer end portion 3b thereof (see FIG. 8).

On the other hand, shearing stress due to transfer torque is also occurred on these inner and outer end portions 3a, 3b of the diaphragm 3, and stress due to misalignment of the component parts is also occurred.

Thus, shortening of the axial length of the flexible external gear tends to cause the excess stress concentration on the portions of the diaphragm 3. For relieving the stress concentration, it is necessary to increase the outer diameter of the diaphragm. It is, however, in the silk-hat type flexible engagement gear device that the size of the outer diameter thereof depends on that of the outer diameter of the flexible external gear. Thus, increase the size of the outer diameter of the flexible external gear causes to increase in size of the device outer diameter. This may be an obstacle to downsizing and compacting of the device.

DISCLOSURE OF INVENTION

An object of this invention is, in consideration of aforementioned points, to realize a structure that is able to relieve the stress occurred on the diaphragm of the flexible external gear without increasing the outer diameter of the flexible external gear.

In order to achieve the above object, according to this invention, novel sectional shapes are employed for the respective portions of the silk-hat shaped flexible external gear of the silk-hat type flexible engagement gear device.

A silk-hat type flexible engagement gear device to which this invention can be applied comprises a circular rigid internal gear, a flexible external gear inside the rigid internal gear, and a wave generator arranged inside the flexible external gear for flexing the external gear radially to engage partially with the internal gear and for moving engagement portions of these gears along a circumferential direction. Further, the flexible external gear has a silk-hat shape having an annular body part formed on an outer circumferential surface at a side of one opening end thereof with external teeth, a circular diaphragm integrally connected at its inner circumferential end with the other opening end of the body part, and a circular boss integrally formed on an outer circumferential end portion of the diaphragm. Furthermore, the diaphragm has a root part connected to the boss, a plate-shaped part extending radially and inwardly from the root part, and a curved part for connecting the plate-shaped part to the body art smoothly. In addition, the body part has a tooth part where external teeth are formed, and a body main part extending from the tooth part to the curved part and connected to the curved part smoothly.

In the above constituted silk-hat type flexible engagement gear device according to this invention, the flexible external gear has the diaphragm having a shape of a cross section including a device axis, the shape being defined as follows. Namely, one side of the shape of the cross section including the device axis of the plate-shaped part of the diaphragm is defined by a first profile line which includes a straight line extending perpendicular to the device axial line. The other side of the shape of the cross section including the device axis of the plate-shaped part is defined by a second profile line which includes a first convex circular arc smoothly connected to the root part, a concave circular arc smoothly connected to the first convex circular arc, and a second convex circular arc smoothly connected to the concave circular arc which is connected smoothly to the curved part. Further, a portion defined by the straight line and the concave circular arc is set to be the minimum thickness portion of the diaphragm.

Among the first convex circular arc, the second convex circular arc and the concave circular arc defining the second profile line, the first convex circular arc is set to have the smallest curvature and the concave circular arc is set to have the maximum curvature, which is preferable.

It is also preferable to locate the minimum thickness portion at the middle of the plate-shaped part of the diaphragm.

With the thickness of the diaphragm being set as aforementioned, it is possible to reduce the stress occurred on the flexible external gear (bending stress by the wave generator, shearing stress accompanied by torque transfer and stress due to misalignment).

Next, a silk-hat type flexible engagement gear device according to this invention is characterized by setting the curved part of the diaphragm of the flexible external gear thicker than the body part. In an preferred embodiment, the curved part of the diaphragm is set thicker than the plate-shaped part thereof, wherein the curved part of the diaphragm is preferably thickest at the middle portion thereof. It is also preferable that the thickness of the curved part is set to reduce gradually from the middle portion thereof toward the side of the body and toward the plate-shaped part By setting the thickness of the curved part as mentioned above, the stress occurred on the flexible external gear can be reduced. In particular, fatigue strength and buckling strength of the flexible external gear can be enhanced.

On the other hand, a silk-hat type flexible engagement gear device according to this invention is characterized by setting a portion of the body main part of the body part of the flexible external gear connected to the curved part to be thicker than a portion of the body main part connected to the tooth part. In a preferred embodiment, the body main part has the maximum thickness at a portion connected to the curve part Preferably, the body main part has the minimum thickness at a portion connected to the curved part. It is also preferable that the body main part is set to have the thickness which reduces gradually from a portion thereof connected to the curved part toward a portion thereof connecting to the tooth part.

The body main part is set to have the thickness as mentioned above, so that the stress occurred on the flexible external gear can be reduced, and fatigue and buckling strengths can also be improved.

While, in a preferred embodiment of this invention, among the diaphragm, curved part and body main part of the flexible external gear, two or all elements thereof are set to have the thickness as mentioned above.

BEST MODE FOR CARRYING OUT THE INVENTION

Referring now to the drawings, a silk-hat type flexible engagement gear device to which this invention is applied will be described.

(Overall structure)

Figure 1:
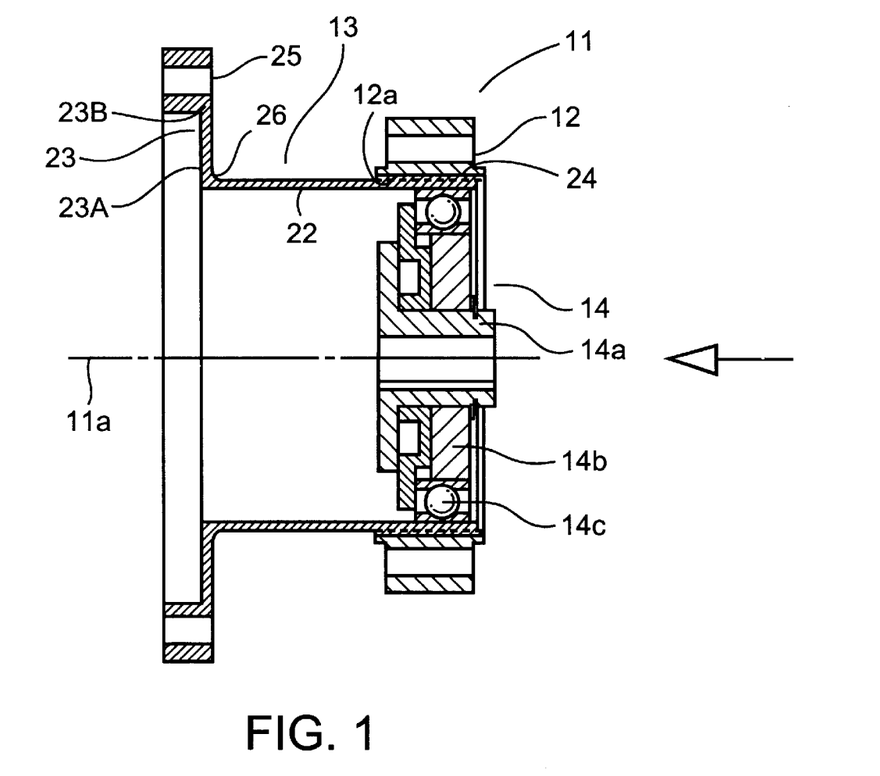
FIG. 1 is a schematic longitudinal sectional view of a silk-hat type flexible engagement gear device to which this invention can be applied.
Figure 2:
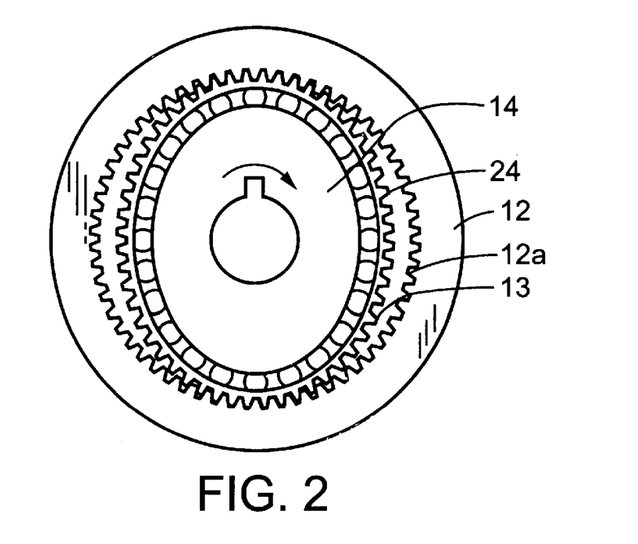
FIG. 2 is a schematic front view of the device of FIG. 1, viewed in the direction of an arrow.

With reference to FIGS. 1 and 2, an overall structure of a silk-hat type flexible engagement gear device to which this invention can be applied will be explained, A flexible engagement gear device 11 is constituted by a circular rigid internal gear 12, a flexible external gear 13 having a silk-hat shape arranged inside the rigid internal gear, and an elliptical wave generator 14 inserted inside the flexible external gear. The flexible external gear 13 comprises an annular body part 22, a circular diaphragm 23 having an inner circumferential end 23A connected to a proximal end opening of the body, and a circular thick boss 25 integrally connected to an outer circumferential end 23B of the diaphragm 23. Teeth 24 are integrally formed on an outer circumferential part on the opening end at the side of a proximal end of the body part 22. The circular boss 25 is for mounting the device on another member (not shown), by which the body part 22 and the diaphragm 23 are supported in a cantilevered condition.

On the other hand, the wave generator 14 is constituted by a hollow hub 14a, an elliptical rigid cam plate 14b, and a ball bearing 14c fixed on an outer circumferential surface of the cam plate. With the wave generator 14, the flexible external gear is flexed of a portion of the body part 22 formed with the external teeth 24, so that two portions of the external teeth 24 located at both ends of the major axis of an ellipse are forced to engage with internal teeth 12a of the rigid internal gear 12. As the wave generator 14 rotates with maintaining this condition, these engagement portions are also moved in the circumferential direction. With this rotational movement, relative rotation between the flexible external gear 13 and the rigid internal gear 12 is produced according to the difference in number of teeth between the external and internal gears. Accordingly, where the rigid internal gear 12 is fixed and the wave generator 14 is set to be an input element of high speed rotation, for example, the external gear 13 is an output element of reduced speed rotation, through which a rotational output of reduced speed can be obtained.

(First Example of the Flexible External Gear)

Figure 3:
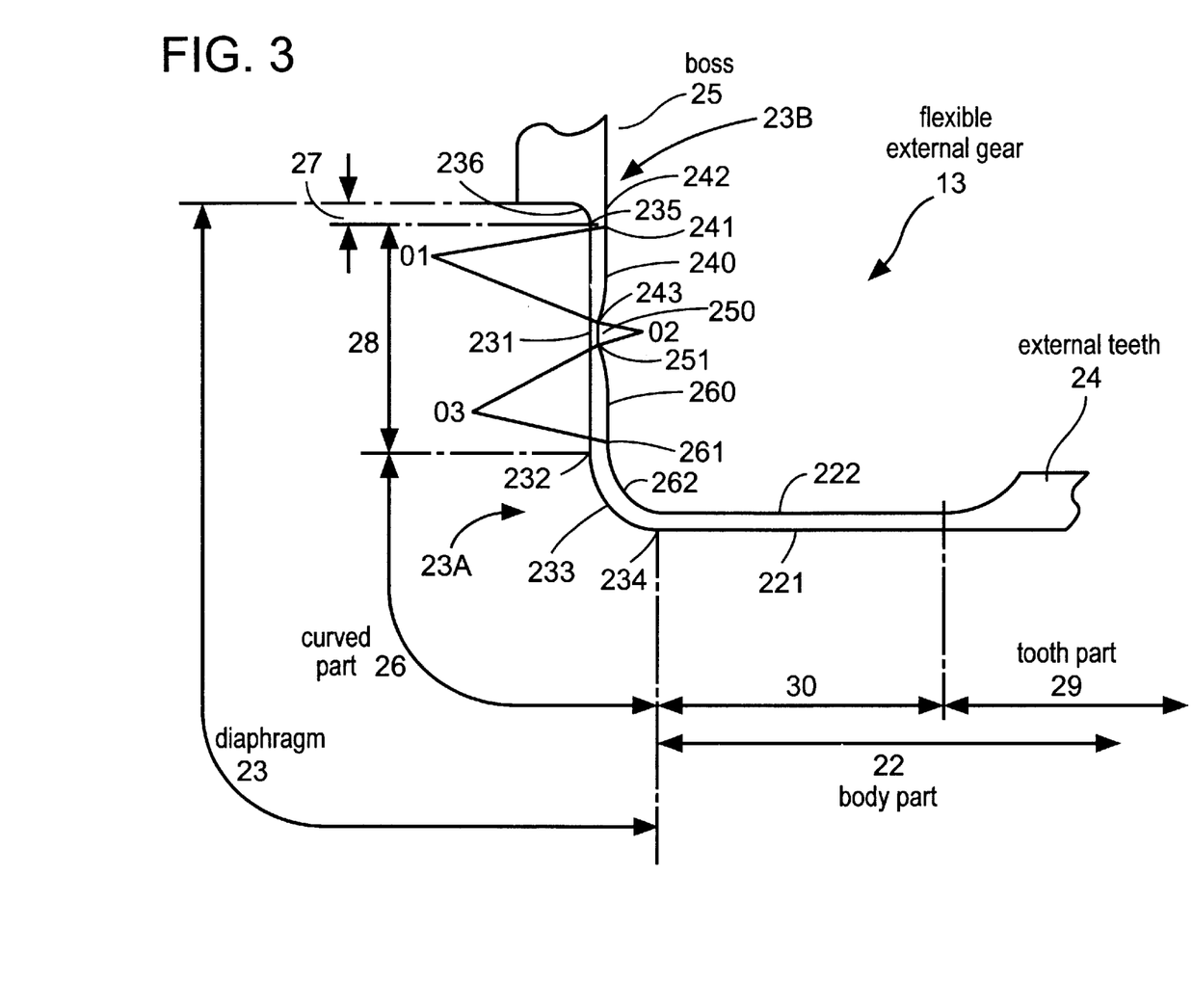
FIG. 3 is a sectional view of a flexible external gear having a silk-hat shape to which this invention is applied, when taken along a device axis.

FIG. 3 is a half sectional view of the flexible external gear 13, when cut along a plane including a device axial line 11a. As shown in this figure, the diaphragm 23 of the flexible external gear 13 has a root part 27 connected to the boss 25, a plate-shaped part 28 extending radially and inwardly from the root part 27, and a curved part 26 for smoothly connecting the plate-shaped part 28 to the body part 22. The body part 22 in turn has a tooth part 29 where the external teeth 24 are formed, and a body main part 30 extending from the tooth part 20 to the curved part 26 and connected to the curved part 26 smoothly.

The diaphragm 23 and the body part 22 of the flexible external gear 13 has a sectional shape defined as follows.

First, the sectional shape thereof is defined at its inner side by a profile line (a first profile line) which includes a straight line 231 extending in a direction perpendicular to the device axial line 11a (in a radial direction), The straight line 231 has a radially inner end 232 to which a circular arc 233 defining the curved part 26 is connected smoothly. The other end of the circular arc 233 is smoothly connected at a point 234 to a straight line 221 extending along the device axial line 11a and defining an inner circumferential surface side of the body part 22. While, an outer end 235 of the straight line 231 is smoothly connected to a circular arc 238 defining the root part 27, which in turn is smoothly connected to the inner circumferential surface side of the boss 25.

On the other hand, the outer side of the sectional shape is defined by a profile line (a second profile line) which includes a first convex circular arc 240, a concave circular arc 250 and a second convex circular arc 260 for defining the plate-shaped part 28 of the diaphragm 23.

The first convex circular arc 240 has a center of point of whose radially outer end 241 is smoothly connected to a straight line 242 defining the root part 27. The straight line 242 has the other end connected to the side of the boss 25.

A radially inner end 243 of the first convex circular arc 240 is smoothly connected to the concave circular arc 250 which has a center of point O2. A radially inner end 251 of the concave circular arc 250 is smoothly connected to the second convex circular arc 260 which has a center of point O3. The convex circular arc 260 has a radially inner end 261 smoothly connected to a circular arc 262 defining the outer circumferential side of the curved part 26. The other end of the circular arc 262 is smoothly connected to a straight line 222 extending along the device axial line 11a and defining the outer circumferential side of the body main part 30 of the body part 22.

The first convex circular arc 240 has a curvature slightly smaller than that of the second convex circular arc 260. Whereas, the concave circular arc 260 has a curvature greatly larger than those of the convex circular arcs 240 and 260. The concave circular arc 250 is located at the middle portion of the plate-shaped part 28 of the diaphragm 23. This concave circular arc 250 and the straight line 231 at the opposite side define a portion of minimum thickness of the diaphragm 23.

The thus constituted silk-hat type flexible engagement gear device 11 were tested, by which it was confirmed that the stress occurred on the diaphragm 23, particularly on its inner and outer circumferential ends 23A and 23B can be greatly reduced.

(Second Example of the Flexible External Gear)

Figure 4:
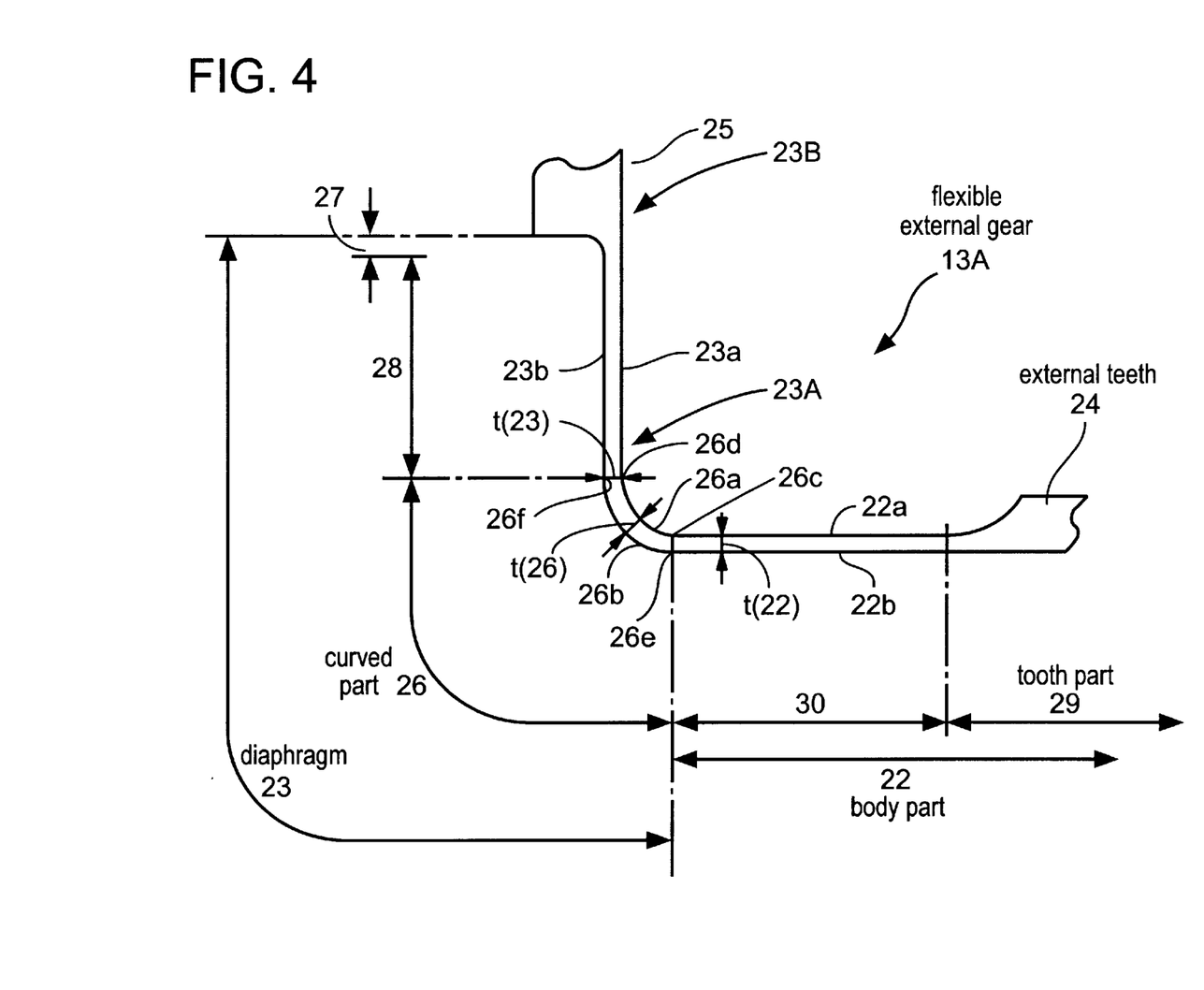
FIG. 4 is a sectional view of another example of the flexible external gear having a silk-hat shape to which this invention is applied, when taken along a device axis.

FIG. 4 is a half sectional view of a flexible external gear according to the second example. A flexible external gear 13A has a circular boss 25, a diaphragm 23 and a body part 22 as like as the flexible external gear 13. The diaphragm 23 has a root part 27 connected to the boss 25, a plate-shaped part 28 extending radially and inwardly from the root part 27, and a curved part 26 for smoothly connecting the plate-shaped part 28 to the body part 22. Further, the body part 22 has a tooth part 29 where external teeth 24 are formed, and a body main part 30 extending from the tooth part 29 to the curved part 26 and smoothly connected to the curved part 26.

The curved part 26 of the diaphragm 23 of the flexible external gear 13A is defined at its outer and inner circumferential sides respectively by circular arcs 26a and 26b projecting inwardly. The circular arc 26a at the outer circumferential side has both ends 26c and 26d which are smoothly connected to a straight line 22a defining an outer circumferential side of the body main part 30 of the body part 22 and to a straight line 23a defining one side of the plate-shaped part 28 of the diaphragm 23, respectively. Likewise, both ends 26e and 26f of the circular arc 26b at the inner circumferential side are smoothly connected to a straight line 22b defining an inner circumferential side of the body main part 30 of the body part 22 and to a straight line 23b defining the other side of the plate-shaped part 28 of the diaphragm 23, respctively.

It is noted that, in the drawing, the curved part 26 ranges from a point 26e to a point 26f defined by the circular arc 26b at the outer circumferential side.

In this example, the relationship among the thickness t(26) of the curved part 26, that t(22) of the body main part 30 of the body part 22, and that t(23) of the plate-shaped part 28 of the diaphragm 23 are set as follows.

t(26)>t(22)
t(26)>t(23)

Further, in this example, the thickness t(26) of the curved part 26 is set so that the middle portion of the curved part 26 has the maximum thickness and that the thickness is gradually reduced from the middle portion toward the body main part 30 and toward the plate-shaped art 28.

The silk-hat type flexible engagement gear device 11 having the flexible external gear 13A assembled therein were tested, by which it was confirmed that the stress occurred on the flexible external gear 13A (bending stress by the wave generator, shearing stress accompanied by torque transfer and stress due to misalignment) can be reduced. In particular, it was confirmed that the fatigue and buckling strengths are enhanced. Hence, the structure of this example is employed to realize a flexible external gear having a short axial length and a small outer diameter. Use of this flexible external gear makes it possible to manufacture a small and compact flexible engagement gear device.

(Third Example of the Flexible External Gear)

Figure 5:
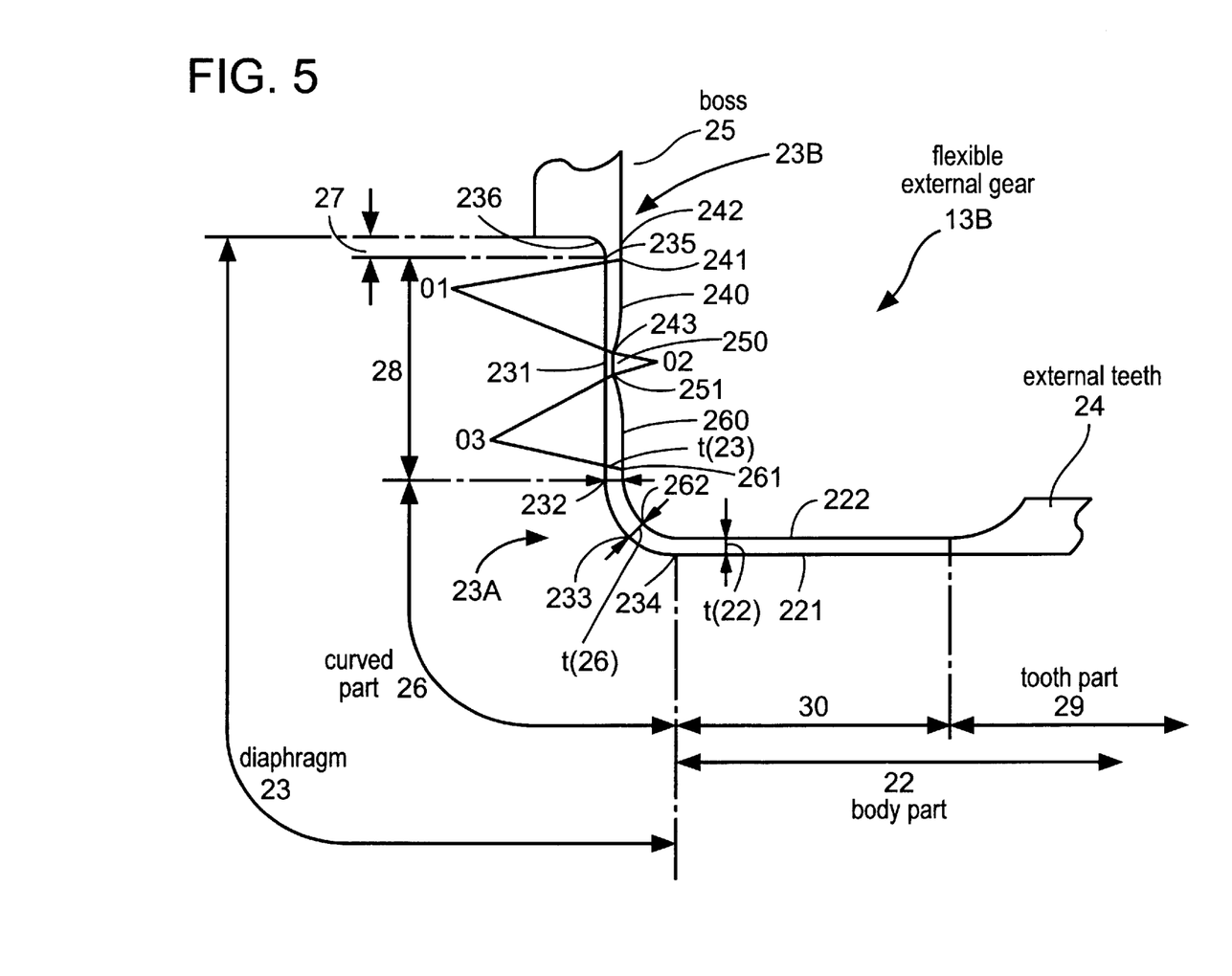
FIG. 5 is a sectional view of yet another example of the flexible external gear having a silk-hat shape to which this invention is applied, when taken along a device axis.

FIG. 5 is a half sectional view of a flexible external gear according to the third example. The sectional shape of this flexible external gear 13B is obtained by combining those of the flexible external gears of FIGS. 3 and 4.

More specifically, as like as the flexible external gear 13, the flexible external gear 13B has a circular boss 25, a diaphragm 23 and a body part 22. The diaphragm 23 has a root part 27 connected to the boss 25, a plate-shaped part 28 extending radially and inwardly from the root part 27, and a curved part 26 for smoothly connecting the plate-shaped part 28 to the body part 22. Further, the body 22 has a tooth part 29 where external teeth 24 are formed, and a body main part 30 extending from the tooth part 29 to the curved part 26 and smoothly connected to the curved part 26.

The flexible external gear 13B has a sectional shape when cut along a plane including the device axis, the sectional shape being set as follows. The side of the plate-shaped art 28 smoothly connected to a circular are 233 which defines the inner side of the curved part 26, is defined by a straight line 231 extending in a direction perpendicular to the device axial line 11a (in a radial direction), The straight line 231 has a radially outer end 235 smoothly connected to a circular arc 236 which defined the root part 27, and the circular arc 236 is connected smoothly to the side of the boss 25. While, the other side of the circular arc 233 is smoothly connected at a point 234 to a straight line 221 which extends along the device axial line 11a and defines the Inner side of the body main part 30 of the body part 22.

On the other hand, the outer side of the curved part 26 of the diaphragm 23 is defined by a circular arc 262 which is smoothly connected to the side of the plate-shaped part 28. The plate-shaped part 28 is, as like as that shown in FIG. 3, defined at one side by a straight line 231 and at the other side by a first convex circular are 240, a concave circular arc 250, and a second convex circular arc 260.

Further, the thickness t(26) of the curved part 26 is set larger than that t(22) of the body main part 30 and t(23) of the plate-shaped part 28.

With the thus constituted flexible external gear 13B being used, it was confirmed that effects similar to those obtained by the above-mentioned flexible external gears 13 and 13A can be obtained, and that the stress occurred on the diaphragm 23, particularly on its inner and outer circumferential ends 23A and 23B can be greatly reduced.

(Fourth Example of the Flexible External Gear)

Figure 6:
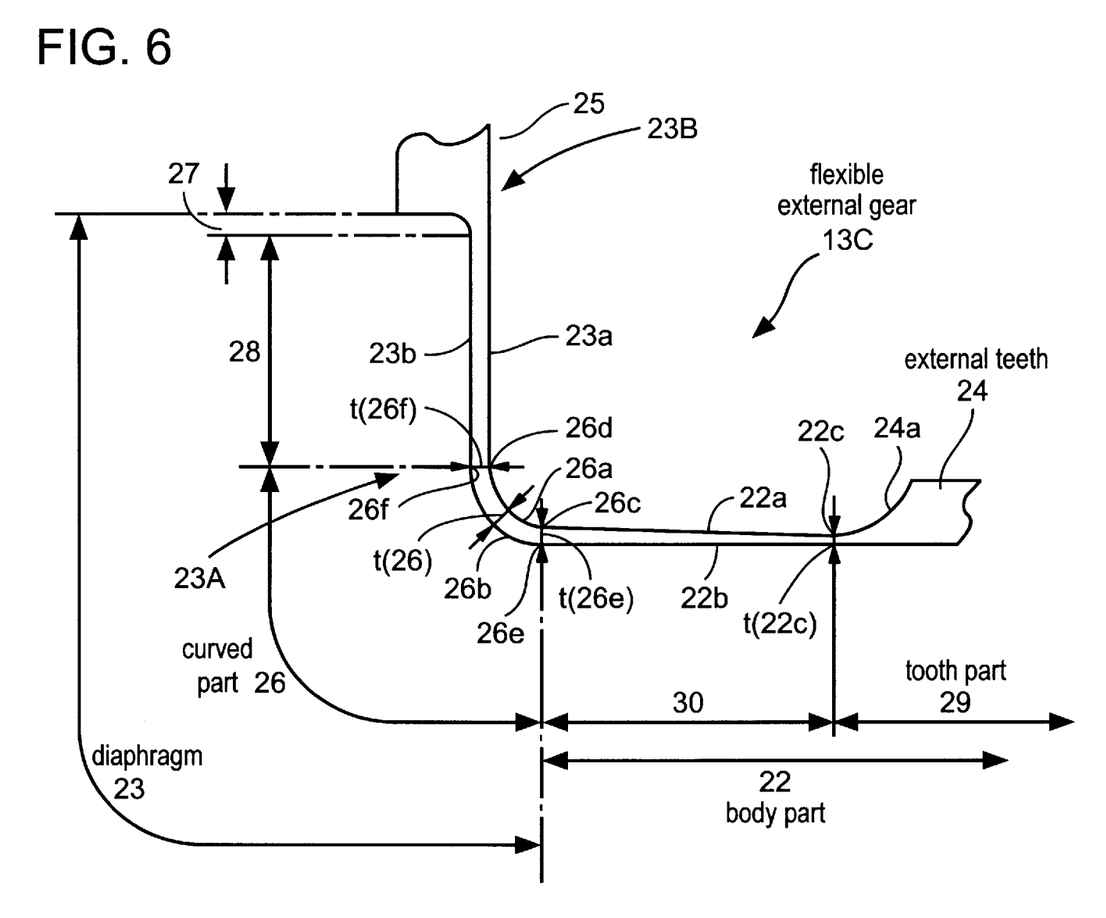
FIG. 6 is a sectional view of still another example of the flexible external gear having a silk-hat shape to which this invention is applied, when taken along a device axis.

FIG. 6 is a half sectional view of the flexible external gear according to the fourth example. The flexible external gear 13C also has a circular boss 25, a diaphragm 23 and a body part 22 as like as the flexible external gear 13. The diaphragm 23 has a root part 27 connected to the boss 25, a plate-shaped part 28 extending radially and inwardly from the root part 27, and a curved part 26 for smoothly connecting the plate-shaped part 28 to the body part 22. Further, the body part 22 has a tooth part where external teeth 24 are formed, and a body main part 30 which extends from the tooth part 29 to the curved part 26 and is connected smoothly to the curved part 26.

The sectional shape of the flexible external gear 13C when cut along a plane including a device axis is as follows. The body part 22 is defined at its inner side by a straight line 22b extending parallel with a device axial line 11a. The body main part 30 at the outer side of the body part 22 is defined by a straight line 22a which is inclined from a point smoothly connected to the side of the curve part 26 toward the tooth part 29. Thus, the thickness of the body main part 30 is defined by these two straight lines 22a and 22b is gradually reduced toward the side of the tooth part 29. In addition, a portion of the maximum thickness of the body main part 30 is located at a point where the curved part 26 is connected, and a portion of the minimum thickness is at a point where the tooth part 29 is connected.

The straight line 22a at the outer side of the body main part 30 has an end 22c which is smoothly connected to a circular arc 24a defining the tooth part 29. The straight line 22b at the outer side of the body main part 30 is extended as it is toward the tooth part 29 to define the inner circumferential surface side of the tooth part 29. While, the other end 26c of the straight line 22a at the outer circumferential surface side is smoothly connected to a circular arc 26a which defines the inner circumferential surface side of the curved part 26 The other end 26e of the straight line 22b at the inner circumferential surface side is smoothly connected to a circular arc 26b defining the inner circumferential surface side of the curved part 26.

The body main part 30 and the curved part 26 merge at the point 26e, while the body main part 30 and the tooth part 29 at the point 22c. Thus, in this example, the body main part 30 ranging from the point 26e to the point 22c defined by the straight lines 22a and 22b, has the thickness which reduces gradually from one end (point 26e) toward the other end (point 22c). In other words, compared to the thickness t(26e) of the point 26e, that t(22c) of the point 22c is small.

On the other hand, the curved part 26 is, as mentioned above, defined at its inner and outer circumferential surface sides by circular arcs 26a and 26b both projecting inwardly. The circular arc 26a at the outer circumferential surface side has an end 26d which is smoothly connected to a straight line 23a defining one side of the plate-shaped part 28. Likewise, the circular arc 26b at the inner circumferential surface side has an end 26f which is smoothly connected to a straight line 23b defining the other side of the plate-shaped part 28.

In this example, the curved part 26 is designed so that it has the maximum thickness at its middle portion and that its thickness reduces gradually toward both sides thereof. Namely, the relationship of the maximum thickness t(26), the thickness t(26e) of the point 26e connected to the body main part 30 and the thickness t(26f) of the point 26f connected to the plate-shaped part 28 are determined as follows.

t(26)>t(26e)
t(26 >t(26f)

According to this example, the thickness of the body main part 30 is gradually reduced from the side of the curved part 26 toward the side of the tooth part 29. The silk-hat type flexible engagement gear device 11 with the flexible external gear 13C being assembled was tested to confirm that the stress occurred on the flexible external gear 13C (the bending stress by the wave generator, shearing stress accompanied by torque transfer and stress due to misalignment) can be relieved.

Further, according to this example, since the thickness of the curved part 26 is set as mentioned above, the stress occurred on the flexible external gear 13C can be reduced further more, which was confirmed. It was also confirmed that, by setting the thickness of the curved part as mentioned above, the fatigue and buckling strengths of the flexible external gear 13C can be improved.

As a result with the structure of this example being adopted, it is possible to realize a flexible external gear having a short axial length and a small outer diameter.

In this example, the body main part 30 is tapered at the outer circumferential surface side. Instead, it may be tapered at the inner circumferential surface side. Further, in this example, the body main part 30 has the sectional shape formed by the two straight lines 22a and 22b when cut along the axial direction. Alternatively, a plurality of curves connecting smoothly one by one are used so that the thickness of the body main part 30 is reduced gradually toward the side of the tooth part (Fifth Example of the Flexible External Gear)

Figure 7:
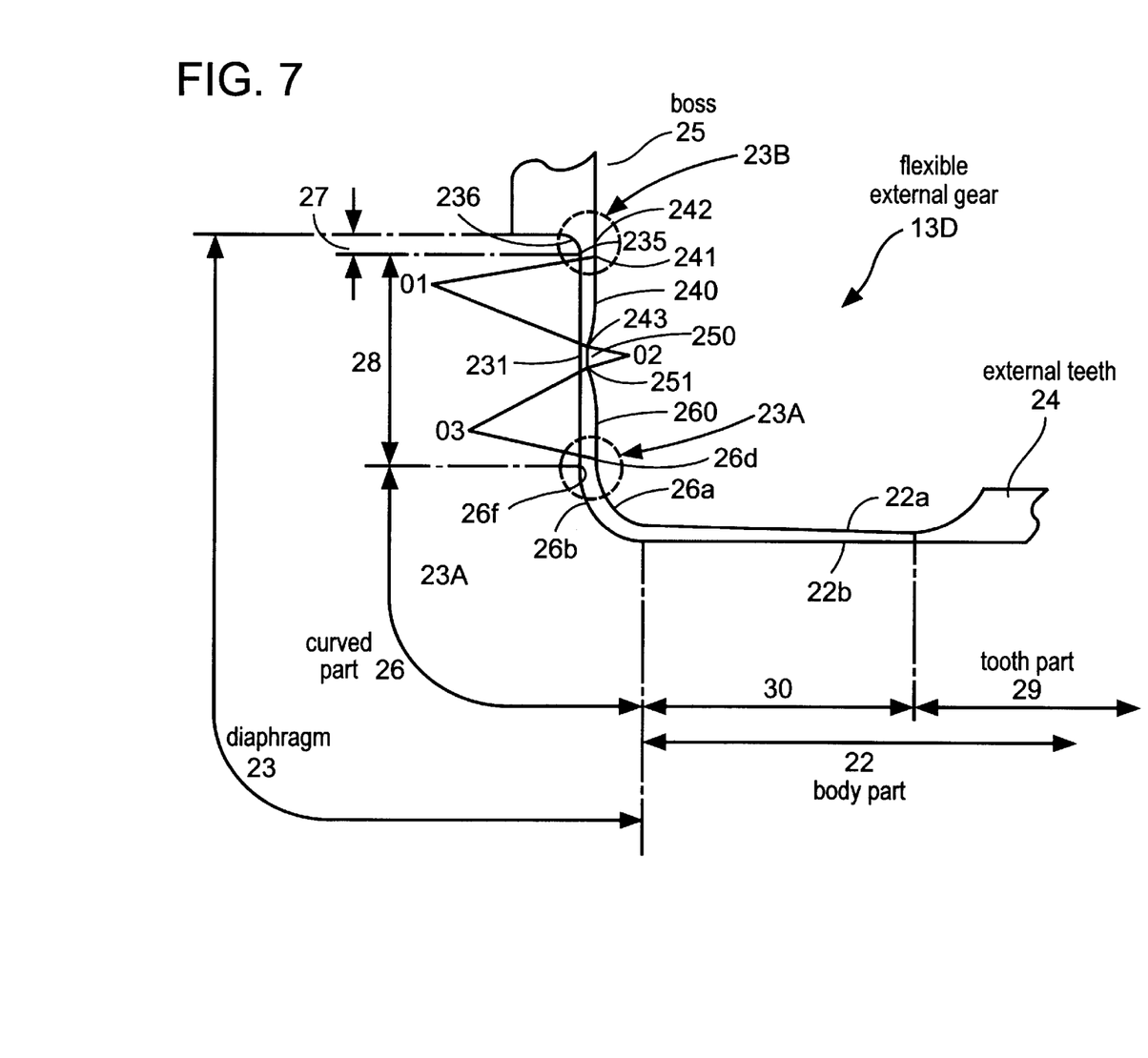
FIG. 7 is a sectional view of another example of the flexible external gear having a silk-hat shape to which this invention is applied, when taken along a device axis.

FIG. 7 is a half sectional view of the flexible external gear according to the fifth example. The flexible external gear 13D has a body part 22 and a curved part 26 of a diaphragm 23 whose shapes are the same as those of the above-mentioned flexible external gear 13C. However, the diaphragm 23 has a plate-shaped part 28 having a different sectional shape.

More specfically, the plate-shaped part 28 is connected to the inner circumferential side of the curved part 26 and is defined by a straight line 231 extending perpendicular to a device axial line 11a (in a radial direction), The straight line 231 has a radially inner end 26f, to which a circular arc 26b defining the inner circumferential side of the curved part 26 is smoothly connected. While, a radially outer end 235 of the straight line 231 is smoothly connected to a circular arc 236 which defines a root part 27 and is smoothly connected to the side of a boss 25.

On the other hand, the side of the plate-shaped part 28 connected to the outer circumferential side of the curved part 26 is generally defined by a first convex circular arc 240, a concave circular arc 250 and a second convex circular arc 260. The first circular convex arc 240 has a center of point O1 and has a radially outer end 241 connected smoothly to a straight lone 242 defining the root part 27. The other end of this straight line 242 is connected to the side of the boss 25.

The first convex circular end 240 is smoothly connected at its radially inner end 243 to the concave circular arc 250 which has a center of point O2. The concave circular arc 250 has a radially inner end 251 connected smoothly to the second convex circular arc 260 which has a center of point O3 and is smoothly connected at its radially inner end 261 to a circular arc 26a defining the outer circumferential side of the curved part 26.

The curvature of the first convex circular arc 240 is slightly smaller than that of the second convex circular arc 260, while the curvature of the concave circular arc 250 is greatly larger than those of the convex circular arcs 240 and 260.

It was confirmed, where the thus constituted flexible external gear 13D is employed, that effects similar to those obtained by the aforementioned flexible external gear 13C can be obtained, and that the stress occurred on the diaphragm 23, particularly on its inner and outer circumferential ends 23A and 23B can be greatly reduced.

INDUSTRIAL APPLICABILITY

As aforementioned, according to the silk-hat type flexible engagement gear device of this invention, the flexible external gear of the silk-hat shape has the diaphragm and the body part whose sectional shapes are determined appropriately, whereby the stress occurred on the flexible external gear can be relieved to thereby obtain a smooth stress distribution as a whole. In addition, the fatigue and buckling strengths of the flexible external gear can also be enhanced.

Thus, according to this invention, even if the flexible external gear is reduced in size of its axial length to increase the coning angle thereof, it is prevented from occurrence an excess stress concentration thereon. As a result, it is not necessary for a short flexible external gear to increase the size of the outer diameter of the diaphragm and other portions thereof in order to relieve the stress concentration thereof, which makes it possible to realize a silk-hat type flexible engagement gear device which is flat and small in diameter.

What is claimed is:

1. A silk-hat type flexible engagement device which comprises a circular rigid internal gear, a flexible external gear inside the rigid internal gear, and a wave generator arranged inside the flexible external gear for flexing the external gear radially to engage partially with the internal gear and for moving engagement portions of these gears along circumferential direction, wherein the flexible external gear has a silk-hat shape which comprises an annular body part formed on an outer circumferential surface at a side of one opening end thereof with external teeth, a circular diaphragm integrally connected at its inner circumferential end with the other opening end of the body part, and a circular boss integrally formed on an outer circumferential end portion of the diaphragm, the diaphragm has a root part connected to the boss, a plate-shaped part extending radially and inwardly from the root part, and a curved part for connecting the plate-shaped part smoothly to the body part, and the body part has a tooth part where the external teeth are formed, and a body main part extending from the tooth part to the curved part and connected smoothly to the curved part, characterized in that one side of a sectional shape of the plate-shaped part of the diaphragm, when cut along a plane including a device axial line, is defined by a first profile line which includes a straight line extending perpendicular to the device axial line, the other side of the sectional shape of the plate-shaped part is defined by a second profile line which includes a first convex circular arc smoothly connected to the root part, a concave circular arc smoothly connected to the first convex circular arc, and a second convex circular arc which is smoothly connected to the concave circular arc connected smoothly to the curved part, and a portion defined by the straight line and the concave circular arc is set to be the minimum thickness portion of the diaphragm.

2. A silk-hat type flexible engagement gear device according to claim 1, characterized in that, among the first convex circular arc, the second convex circular arc and the concave circular arc defining the second profile line, the first convex circular arc is set to have the smallest curvature and the concave circular arc is set to have the maximum curvature.

3. A silk-hat type flexible engagement gear device according to claim 1 or 2, characterized in that the minimum thickness portion is positioned at the middle of the plate-shaped part of the diaphragm.

4. A silk-hat type flexible engagement gear device according to claim 1, characterized in that the curved part of the diaphragm is thicker than the body part.

5. A silk-hat type flexible engagement gear device according to claim 4, characterized in that the curved part of the diaphragm is thicker than the plate-shaped part of the diaphragm.

6. A silk-hat type flexible engagement gear device according to claim 5, characterized in that the curved part of the diaphragm is thickest at the middle portion thereof.

7. A silk-hat type flexible engagement gear device according to claim 6, characterized in that the thickness of the curved part of the diaphragm is gradually reduced from the middle portion thereof toward the body part and the plate-shaped part.

8. A silk-hat type flexible engagement gear device according to claim 1, characterized in that a portion where the body main part of the body part is connected to the curved part is thicker than a portion where the body main part is connected to the tooth part.

9. A silk-hat type flexible engagement gear device according to claim 8, characterized in that the body main part has a maximum thickness portion where it is connected to the curved part.

10. A silk-hat type flexible engagement gear device according to claim 9, characterized in that the body main part has a minimum thickness portion where it is connected to the curved part.

11. A silk-hat type flexible engagement gear device according to claim 10, the thickness of the body main part is gradually reduced from a portion where the curved portion is connected toward a portion where the tooth part is connected.

* * * * *